(12) United States Patent  
Malik et al.

(10) Patent No.: US 8,135,415 B2  
(45) Date of Patent: Mar. 13, 2012

(54) INTEGRATED ACTIVE TAGS IN MOBILE DEVICES

(75) Inventors: Ajay Malik, Santa Clara, CA (US); Robert Perri, Bartlett, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 978 days.

(21) Appl. No.: 12/118,053

(22) Filed: May 9, 2008

(65) Prior Publication Data

US 2009/0280826 A1    Nov. 12, 2009

(51) Int. Cl.
*H04W 24/00* (2009.01)

(52) U.S. Cl. ............... 455/456.1; 455/574; 455/343.1; 455/127.5; 455/414.1; 340/12.5; 340/13.26; 340/539.32

(58) Field of Classification Search .... 455/414.1–414.2, 455/456.1–456.6, 457, 343.1–343.5, 574, 455/127.5; 340/12.5, 12.51, 13.26
See application file for complete search history.

(56) References Cited

U.S. PATENT DOCUMENTS

2002/0105443 A1* 8/2002 Flick ........................ 340/988
2006/0066449 A1* 3/2006 Johnson ................. 340/539.12
* cited by examiner

*Primary Examiner* — Wayne Cai

(57) ABSTRACT

Described are integrated active tags in a mobile device. The mobile device may include (a) a transceiver broadcasting a first location beacon when a capacity of a battery of the mobile device is above a predetermined threshold; and (b) a tag broadcasting a second location beacon when the capacity of the battery of the mobile device is below the predetermined threshold.

8 Claims, 2 Drawing Sheets

INTEGRATED ACTIVE TAGS IN MOBILE DEVICES

FIELD OF THE INVENTION

The present invention relates generally to integrated active tags in mobile devices. Specifically, the tags enable locating the mobile device after a battery life of the mobile device has expired.

BACKGROUND

A mobile unit may transmit signals so that a location of the mobile unit may be determined. However, when the battery of the mobile unit loses enough power or becomes completely discharged, the mobile unit may no longer be able to transmit the signals. Accordingly, the ability to track the location of the mobile unit may be lost.

SUMMARY OF THE INVENTION

The present invention relates to integrated active tags in a mobile device. The mobile device according to an exemplary embodiment of the present invention may include (a) a transceiver broadcasting a first location beacon when a capacity of a battery of the mobile device is above a predetermined threshold; and (b) a tag broadcasting a second location beacon when the capacity of the battery of the mobile device is below the predetermined threshold.

DETAILED DESCRIPTION

Figure 1:
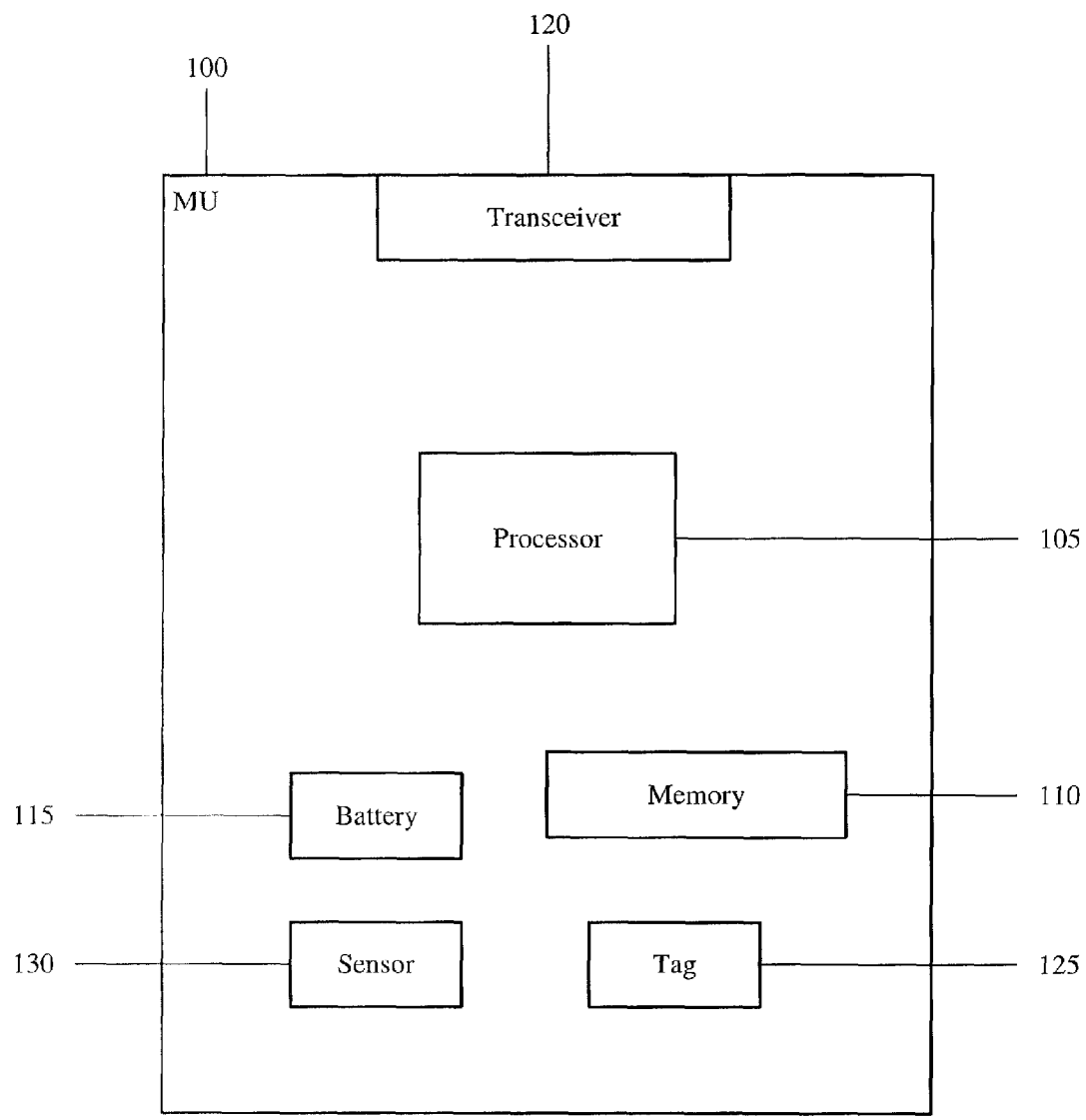
FIG. 1 shows a mobile unit according to an exemplary embodiment of the present invention.

The exemplary embodiments of the present invention may be further understood with reference to the following description and the appended drawings, wherein like elements are referred to with the same reference numerals. The exemplary embodiments of the present invention describe an integrated active tag for a mobile unit (MU). The tag may provide location data of the MU when requested from an outside source. The tag may be activated when a battery of the MU has been completely or nearly discharged. The MU, the tag, the location data, and an associated method will be discussed in further detail below.

FIG. 1a shows a mobile unit (MU) 100 according to a first exemplary embodiment of the present invention. The MU 100 may be any portable electronic device such as a mobile computer, a personal digital assistant (PDA), a laptop, a cell phone, a radio frequency identification reader, a scanner, an image capturing device, a pager, etc. The MU 100 may include a processor 105, a memory 110, a battery 115, a transceiver 120, a tag 125, and a sensor 130.

The processor 105 may be responsible for executing various functionalities of the MU 100. As will be explained in further detail below, according to a first exemplary embodiment of the present invention, the processor 105 may be responsible for determining whether to activate the tag 125 as a function of a capacity remaining in the battery 115. The memory 110 may be a storage unit for the MU 100. Specifically, according to a first exemplary embodiment of the present invention, the memory 110 may store a database of battery capacities. The processor 105 may access the database to make the determination of activating the tag 125. The memory 110 may also store data and/or settings pertaining to various other functionalities of the MU 100. As discussed above, the MU 100 may include a portable power supply. As illustrated, the MU 100 may include the battery 115 to supply the necessary energy to operate the MU 100. The battery 115 may be a rechargeable battery such as a nickel-cadmium battery, a lithium hydride battery, a lithium ion battery, etc. It should be noted that the term "battery" may represent any portable power supply that is capable of providing energy to the MU 100. For example, the battery 115 may also be a capacitor, a supercapacitor, etc.

The transceiver 120 may be a component enabling the MU 100 to transmit and receive wireless signals. For example, the transceiver 120 may enable the MU 100 to associate with a wireless network such as a local area network, a wide area network, etc. The network may include a server, a database, at least one access point, a switch, a network management arrangement, etc. The server may be used to generate a request signal that is transmitted to the MU 100 via the transceiver 120 to request location data relating to the MU 100. The MU 100 may return a reply signal to the server using the transceiver 120 indicating the location of the MU 100. In a first exemplary embodiment, the location of the MU 100 may be determined by the MU 100 using conventional methods such as triangulation, radio signal strength indication, global positioning system, etc. Thus, the reply signal may be location data indicating the location of the MU 100. In a second exemplary embodiment, the location of the MU 100 may be determined by one of the network components such as the server using the conventional methods. Thus, the reply signal may be location data indicating parameters of the MU 100 so that the server may determine the location of the MU 100.

It should be noted that the term "location data" may be used in either of the above exemplary embodiments. That is, "location data" may relate to an actual location of the MU 100 or may relate to parameters used to determine the location such as signal strength. Thus, the use of the term "location data" below may relate to either exemplary embodiment.

The tag 125 may be a miniaturized low power circuit that is an incorporated component of the MU 100 used to transmit location data. Specifically, according to the exemplary embodiments of the present invention, the tag 125 may provide the location data when the battery 115 of the MU 100 has completely discharged or does not include enough charge to enable transmitting the location data via the transceiver 120. As discussed above, the location data may indicate the actual location of the MU 100 or may include parameters used to determine the location of the MU 100. The tag 125 may be incorporated into the MU 100 along with a respective power supply. For example, the tag 125 may include or be connected to a supercapacitor. In a first exemplary embodiment, the power supply for the tag 125 may be disconnected from the tag 125 until required, thereby retaining a maximum capacity at all times. In another exemplary embodiment, the power supply for the tag 125 may be monitored so that when the capacity falls beneath a predetermined threshold, the power supply for the tag 125 is recharged to maintain a minimum capacity at all times.

The tag 125 may be specifically tailored so that its only capability is to transmit the location data. According to an exemplary embodiment of the present invention, the tag 125 may be an active tag. For example, the tag 125 may be an active radio frequency identification (RFID) tag. As an active RFID tag, the tag 125 may include its own transmitter. The tag 125 may be a wireless transmitter of the location data. The means of transmission may include, for example, Wi-Fi, BlueTooth, ZigBee, etc. As discussed above, as an active tag, the tag 125 includes its own power supply. It should be noted that the tag 125 may also be a semi-passive tag. That is, although a respective power supply is included with the tag 125, the battery powers the low power circuitry but does not broadcast a signal. Energy such as radio frequency energy may be reflected back like a passive tag. The power supply for a semi-passive tag may also store energy from a reader to emit a response in the future. That is, the power supply may be charged completely independent to the MU 100.

It should be noted that the use of the transmitter is only exemplary. The tag 125 may also include a receiver or transceiver. The tag 125 may receive a signal of a request for the location data. Upon receipt, the tag 125 may transmit the location data. In another exemplary embodiment, the tag 125 may continuously broadcast the location data until either the power supply has been depleted or the MU 100 has been found.

The sensor 130 and/or the processor 105 may determine a remaining capacity of the battery 115. The sensor 130 may periodically, constantly, or upon request, determine the capacity of the battery 115. The remaining capacity of the battery 125 may determine when the tag 125 is to be used to transmit the location data. For example, when the remaining capacity of the battery 115 is not sufficient to transmit the data via the transceiver 120, the tag 125 may be activated. As discussed above, the power supply of the tag 125 may be disconnected until required. The tag 125 may be activated by connecting the power supply to the tag 125. The sensor 130 may also be used to track a capacity of the power supply of the tag 125. If the power supply of the tag 125 is discharged or insufficient, then the location data cannot be transmitted. The capacity of the power supply of the tag 125 may also indicate a need for charging.

Figure 2:
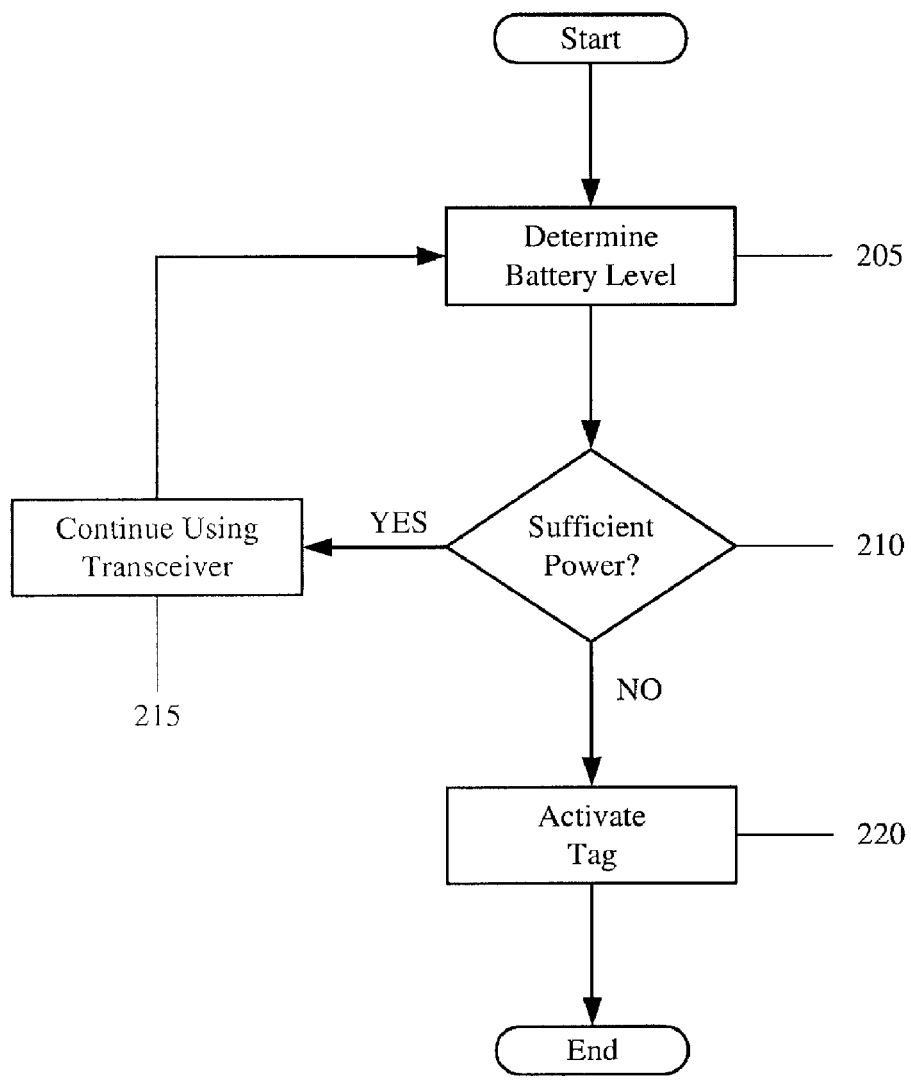
FIG. 2 shows a method for providing location data of the mobile unit of FIG. 1 according to an exemplary embodiment of the present invention.

FIG. 2 shows a method 200 for providing location data of the MU 100 of FIG. 1 according to an exemplary embodiment of the present invention. The method 200 may be used to determine which components are to be used at a given time to provide the location data. The method 200 will be described with reference to the MU 100 of FIG. 1.

In step 205, the battery level is determined. As discussed above, the sensor 130 may determine the remaining capacity of the battery 115. In step 210, a determination is made whether sufficient power remains in the battery 115. Specifically, the determination may be compared to a predetermined threshold of capacity. The predetermined threshold may be a minimum power necessary to determine the location of the MU 100 and transmit location data.

If sufficient power remains in the battery 115, the method 200 continues to step 215 where the components of the MU 100 such as the processor 105 and the transceiver 120 are used to determine and transmit the location data. As discussed above, the location data may indicate the actual location of the MU 100 (e.g., the processor 105 determines the location of the MU 100, is associated with another network and receives the location of the MU 100, etc.) or may be parameters of the MU 100 so that the location of the MU 100 may be determined by one of the network components (e.g., signal strength). The method 200 returns to step 205 where the battery level is determined. As discussed above, the battery level may be determined upon request, periodically, or continuously. Thus, if the battery level is determined periodically, the method 200 may include a step between step 215 and step 205 where a timer is activated. The timer may determine when another battery level determination is to be made.

If sufficient power does not remain in the battery 115, the method 200 continues to step 220. In step 220, the tag 125 is activated. As discussed above, the tag 125 may be activated at various times. In a first exemplary embodiment, the tag 125 may be activated so long as the respective power supply has energy. In the first exemplary embodiment, the tag 125 may be enabled to send the location data at any time. For example, if the battery 115 becomes dislodged, the MU 100 may no longer be powered. The tag 125 may already be activated to provide the location data. In a second exemplary embodiment, the tag 125 may already be connected to its respective power supply and be activated by the processor 105. For example, the processor 105 may activate the tag 125 when the capacity of the battery 115 drops below the predetermined threshold. In another example, the processor 105 may activate the tag 125 whenever the MU 100 becomes deactivated (e.g., shut down sequence activation ends with activation of the tag 125). In a third exemplary embodiment, the tag 125 may be disconnected from its respective power supply. When the tag 125 is to be activated, the respective power supply may be connected to the tag 125 to supply the power, thereby activating the tag 125. For example, the respective power supply may be moved into position so that a circuit with the tag 125 is completed. In this example, the processor 105 may also use the determination of the battery level in step 205 to determine if there is sufficient power to move the respective power supply into a proper orientation.

It should be noted that the method 200 may include additional steps. For example, as discussed above, the tag 125 may include a receiver or transceiver to receive a signal of a request for the location data. Thus, after step 220, the method 200 may include an additional determination of whether the request signal has been received. If the request was received, the method 200 may include a step of transmitting the location data. If the request was not received, the method 200 may include a step of maintaining a low power consumption mode and return to the determination step of whether the request signal was received. In another example, after step 205, another determination may be made of the battery level of the power supply of the tag 125. In a similar determination as step 210, if sufficient power exists in the power supply of the tag 125, then the method may continue to step 210. If sufficient power does not exist in the power supply of the tag 125, it may be recharged accordingly.

In yet another example, upon activation of the tag 125, the method 200 may include an additional step of transmitting the location data. The tag 125 may transmit the location data according to the exemplary embodiments described above. That is, in the first exemplary embodiment, the tag 125 may be equipped with components (e.g., as part of the circuitry) that determines the location of the MU 100. For example, the tag 125 may be associated with another network that determines the location of the MU 100 and returns a signal indicating the location. The tag 125 may package the location into a signal such as a beacon so that the network in which the MU 100 is associated may receive the location data indicating the location of the MU 100. In the second exemplary embodiment, the tag 125 may transmit signals indicating parameters of the MU 100. A component of the network in which the MU 100 is associated may receive the parameters from the tag 125 and determine the location of the MU 100.

As discussed above, the location data of the MU 100 may be accomplished using any conventional means such as triangulation, received signal strength indication, global position system, etc. The determination of the location may also entail the MU 100 being associated with another network.

According to the exemplary embodiments of the present invention, the tag 125 may be a very low cost and not physically demanding to be included in the MU 100. The tag 125 may be incorporated into the MU 100 through a variety of ways. In a first example, a housing of the MU 100 may include a recess in which the tag 125 is received. The recess may include connectors to the processor 105, the battery 115, etc. In another example, the recess in which the battery 115 is received may be adjusted to accommodate the tag 125. In this example, the tag 125 may be in proximity to the battery 115 and the sensor 130 so that the tag 125 may be readily activated, if not already activated. In yet another example, the tag 125 may be a module. As a module, the tag 125 may be received via connectors at a connection point (e.g., USB). As a module, the tag 125 may also be placed within the housing of the MU 100 where space is available. In this example, the tag 125 may be a wholly separate component that is permanently activated. Furthermore, as a module, the tag 125 may be included into any MU 100, whether the design of the MU 100 was created to incorporate the tag 125 or not.

According to the exemplary embodiments of the present invention, the tag 125 may enable the MU 100 to be found even when the battery 115 has been discharged completely or up to a point where transmissions cannot be sent. The tag 125 may be a backup transmitter to send a signal indicating the location of the MU 100. It should be noted that the tag 125 may also be a primary transmitter to send the signal indicating the location of the MU 100. Therefore, when a broadcast beacon is transmitted from a remote source such as an access point, if the MU 100 is within an operating area of the remote source (e.g., within a range of the broadcast beacon) and the tag 125 is activated, the tag 125 may reply to the broadcast beacon that requests the location of the MU 100 by transmitting the location data to the remote source.

It should also be noted that the tag 125 may be used when the MU 100 has been deactivated. That is, the tag 125 may receive a signal from the processor 105 indicating that the MU 100 is to be shut down, thereby deactivating all components of the MU 100. For example, if the MU 100 is activated and left idle for a predetermined time (e.g., when the MU 100 is lost and still activated), the processor may initiate a shut down sequence to conserve power. The battery 115 may still have enough power for the processor 105 and the transceiver 120 to function. However, because the components are deactivated, a beacon from a component of the network may be ignored. The tag 125 may be activated when the MU 100 is deactivated so that the location data may be transmitted from the tag 125 as a reply signal to the beacon.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A mobile device, comprising:
   a transmitter broadcasting a first location beacon when a capacity of a battery of the mobile device is above a predetermined threshold, wherein the first location beacon includes location data of the mobile device; and
   a tag broadcasting a second location beacon when the capacity of the battery of the mobile device is below the predetermined threshold, wherein the second location beacon also includes location data of the mobile device, and wherein the tag includes a dedicated power supply that is disconnected unless the capacity of the battery of the mobile device is below the predetermined threshold.

2. The mobile device of claim 1, further comprising:
   a sensor determining the capacity of the tag power supply, wherein the tag power supply can be recharged when the tag power supply capacity falls beneath a predetermined tag power supply capacity threshold to maintain a minimum tag power supply capacity.

3. The mobile device of claim 1, wherein the predetermined threshold is a minimum battery level to determine a location of the mobile device and broadcast the first location beacon.

4. The mobile device of claim 1, wherein the tag is activated when a mobile device sensor determines that the capacity of the mobile device battery is below the predetermined threshold, whereupon the tag will continually broadcast the location data.

5. A method, comprising:
   broadcasting a first location beacon from a transmitter of a mobile device when a capacity of a battery of the mobile device is above a predetermined threshold, wherein the first location beacon includes location data of the mobile device; and
   broadcasting a second location beacon from a tag of the mobile device when the capacity of the battery of the mobile device is below the predetermined threshold, wherein the second location beacon also includes location data of the mobile device; and
   powering the tag with a dedicated power supply that is disconnected unless the capacity of the battery of the mobile device is below the predetermined threshold.

6. The method of claim 5, further comprising:
   determining the capacity of the tag power supply with a sensor, wherein the tag power supply can be recharged when the tag power supply capacity falls beneath a predetermined tag power supply capacity threshold to maintain a minimum tag power supply capacity.

7. The method of claim 5, wherein the predetermined threshold is a minimum battery level to determine the location of the mobile device and broadcast the first location beacon.

8. The method of claim 5, further comprising:
   activating the tag when a mobile device sensor determines that the capacity of the mobile device battery is below the predetermined threshold, whereupon the tag will continually broadcast the location data.

* * * * *